(No Model.)

J. C. MILLER.
SAW MILL DOG.

No. 354,207. Patented Dec. 14, 1886.

WITNESSES
Phil C. Masi.
Ben. Fugitt

INVENTOR
J. C. Miller
by Anderson & Smith
his Attorneys

UNITED STATES PATENT OFFICE.

JOHN C. MILLER, OF DUNKIRK, OHIO.

SAW-MILL DOG.

SPECIFICATION forming part of Letters Patent No. 354,207, dated December 14, 1886.

Application filed April 27, 1886. Serial No. 200,341. (No model.)

*To all whom it may concern:*

Be it known that I, JOHN C. MILLER, a citizen of the United States, residing at Dunkirk, in the county of Hardin and State of Ohio, have invented certain new and useful Improvements in Saw-Mill Dogs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
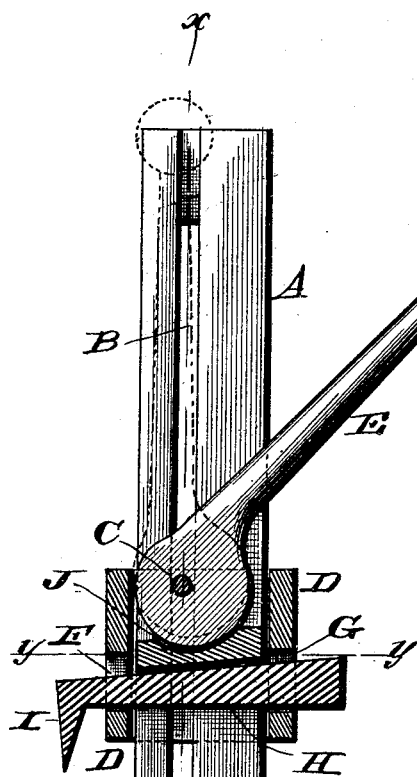
Figure 2:
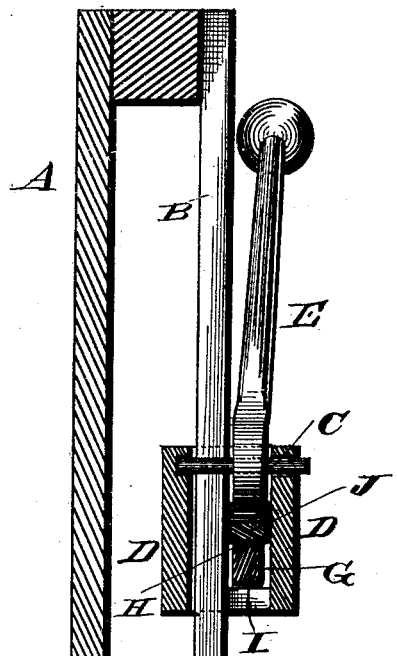
Figure 3:
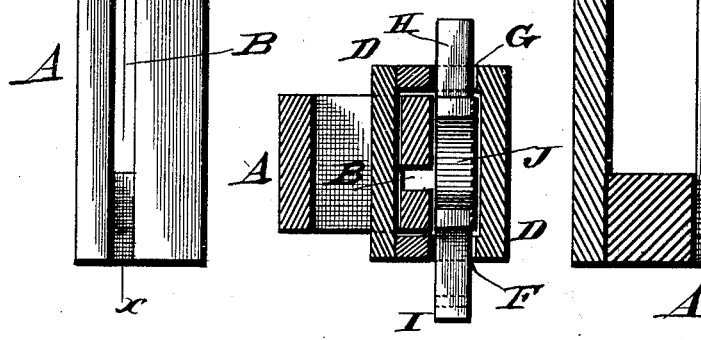

Figure 1 of the drawings is a representation of a side elevation. Fig. 2 is a vertical section on line $x\,x$, Fig. 1. Fig. 3 is a horizontal section on line $y\,y$, Fig. 1.

My invention relates to saw-mill dogs for fastening the log to the knee on the carriage-head block; and it consists in the construction and novel combination of parts as hereinafter described, and pointed out in the claim.

Referring by letter to the accompanying drawings, A designates the knee on the carriage-head, which knee is slotted longitudinally at B in one side, for the passage of the transverse rod C, by which the sliding head D is connected to said slotted side of the knee A, and which forms the fulcrum for the cam-lever E, the head of which lever works within the hollow sliding head D. This head D is provided in its end walls with rectangular openings F and G, which are in alignment, and in these openings the tapering shank H of the dog I is seated. Upon the shank H of the dog I a concavo-plano-block wedge, J, rests within the hollow head, and upon the concave or upper side of this wedge J the cam end of the lever bears. When the stem of the cam-lever is in the vertical position, the dog is unfastened and may be moved in its seat, but when the stem of the cam-lever is in the inclined position the dog is locked or fastened.

Having described this invention, what I claim, and desire to secure by Letters Patent, is—

The combination, with the slotted knee of a saw-mill carriage, of the hollow head, the pin passing through the slot of the knee, the cam-lever journaled on the said pin, which latter also bears the said head, the concavo-plano block in the head above the aligned openings therein, and the dog in the said openings, substantially as specified.

In testimony whereof I affix my signature in presence of two witnesses.

JOHN C. MILLER.

Witnesses:
CORNELIUS FRIEDLY,
D. W. EDGAR.